United States Patent [19]
Young

[11] Patent Number: 5,719,367
[45] Date of Patent: Feb. 17, 1998

[54] WELDING GUN COOLANT CONTROL VALVE ASSEMBLY

[75] Inventor: Andre Young, Livonia, Mich.

[73] Assignee: Syndevco, Inc., Southfield, Mich.

[21] Appl. No.: 643,173

[22] Filed: May 3, 1996

[51] Int. Cl.$^6$ ..................................... B23K 37/02
[52] U.S. Cl. ........................... 219/86.31; 137/459
[58] Field of Search ..................... 219/86.31, 120, 219/121.84, 137.62; 137/458, 459, 464, 466

[56] References Cited

U.S. PATENT DOCUMENTS

| | | | |
|---|---|---|---|
| 4,650,152 | 3/1987 | Doutt | 251/16 |
| 4,742,841 | 5/1988 | Vonderhaar et al. | 137/115.21 |
| 5,153,405 | 10/1992 | Umeda | 219/86.31 |
| 5,378,868 | 1/1995 | Burkhardt et al. | 219/89 |
| 5,471,029 | 11/1995 | Simmons | 219/120 |

FOREIGN PATENT DOCUMENTS

| | | |
|---|---|---|
| 3316868A1 | 5/1984 | Germany. |
| 435031 | 9/1935 | United Kingdom. |

*Primary Examiner*—Matthew V. Nguyen
*Attorney, Agent, or Firm*—Harness, Dickey & Pierce, PLC

[57] ABSTRACT

A coolant control valve assembly for an automatic welding gun. The assembly includes a manifold having a supply passageway and a return passageway for respectively supplying coolant to and receiving coolant from the welding gun. A controller is used to control the supplying of coolant and is coupled to a sensor which detects a reduction in coolant flow through the manifold relative to predetermined flow rate. A check valve is located in the return passageway of the manifold and closes in response to reduced flow.

14 Claims, 4 Drawing Sheets

WELDING GUN COOLANT CONTROL VALVE ASSEMBLY

BACKGROUND OF THE INVENTION

1. Field of the Invention

The present invention generally relates to automatic welding guns and, more particularly, to a control valve assembly which controls the flow of coolant to the welding gun.

2. Description of the Prior Art

Resistance welding guns, to which the present invention is particularly applicable, utilize a high density flow of electrical current to join two overlapping metal workpieces together. The guns typically include two holders, each of which supports an electrode having a tip that contacts the workpieces.

Generally, the welding guns are controlled and moved by robotic arms. The robotic arms orient the electrodes relative to the workpieces and, when properly positioned, pneumatic or hydraulic pressure is used to force a movable holder toward the other or fixed holder. When forced together and contacting the workpieces between them, electrical current flows from one electrode, through the workpieces and to the other electrode. The current discharge generates heat at the interface of the workpieces which results in the welding of the workpieces together.

If the significant heat generated during the welding is too sever and excessive, the heat can cause undue wear, deformation and/or melting of the electrode tips. To prevent this damage, the tips are cooled by circulating a coolant, such as water, through the holder, electrodes and electrode tips.

Coolant is supplied from a source through the supply and return lines of a control system, respectively, to the inlet and from the outlet ports of the gun. Obviously, a dangerous situation arises where one of the electrode tips is damaged, breaks or cracks thereby allowing the highly conductive coolant to leak into the welding area.

In prior systems, coolant flow to the electrode tips was shut off when a pressure differential was sensed, indicating a leak, between the supply and return lines. To monitor and shut off the flow, prior systems have used mechanical sensing mechanisms and valves.

In one prior variety system a check valve was associated with the inlet supply line of the weld gun. The check valve was spring biased and retained in an open position through a mechanical linkage with the welding tip. If the welding tip became dislodged, the check valve was freed and biased into a closed position which blocked the coolant supply line and stopped coolant flow into the welding gun.

The complexity, numerous mechanical parts and slow response times place limitations on the above system. Notably, the above system relies on the dislodgement or catastrophic failure of the welding tip. The system cannot detect a coolant leak through a crack in the electrode or its tip.

In view of the foregoing limitations and shortcomings of the prior art devices, as well as other disadvantages not specifically mentioned above, it should be apparent that there still exists a need in the art for an improved coolant control system.

It is therefore a primary object of this invention to fulfill that need by providing a reliable coolant control valve assembly which quickly responds to undesirable changes in the coolant flow conditions.

Another object of this invention is to provide a coolant control valve assembly having a minimum number of mechanical components and which is, essentially, an electronic control system.

A further object of this invention is to provide a control valve assembly which indicates a fault both when inadequate flow is being received at the welding gun and when a welding tip has been removed, broken or cracked, as indicated by a reduced flow from the welding gun.

SUMMARY OF THE INVENTION

Briefly described, these and other objects are accomplished according to the preferred embodiments of the present invention by providing a coolant control valve assembly that includes an electronic controller, a control valve and a control manifold. The supply and return passageways of the control manifold are respectively connected by supply and return lines to the welding gun.

Located in the return passageway of the manifold is a ball-type, check valve having a valve seat which is located on the upstream side of the ball valve element. An electronic sensor is associated with the return passageway and the check valve. The sensor is preferably a proximity sensor which outputs an electrical signal to the controller, in response to the closing of the check valve by the ball element, indicating that inadequate flow exists in the return passageway. Inadequate flow in the return line can result from a variety of occurrences, including a failure of the coolant supply; a leak in the lines, electrode or electrode tip; or the complete breaking of a line, electrode or tip. In one embodiment, a flow sensor is positioned in the supply passageway of the control manifold and is electrically coupled to the controller to provide a signal when there is inadequate flow through the supply manifold. A control valve and solenoid actuator are also connected in-line with the supply passageway of the manifold. The solenoid is electrically coupled to the controller and responds to the signals from the flow or proximity sensor to close the valve and shut-off the supply of coolant to the welding gun. Electrical power to the welding gun is also controlled through the controller. This allows the controller to electrically shut down the welding gun when the supply of coolant to the welding gun has been interrupted or compromised. With the sensors positioned as disclosed, the present invention has monitoring capabilities for low flow both to and from the electrode tips.

In other embodiments of the invention, one sensor is utilized and located in the return passageway of the manifold with the check valve. That sensor is alternatively disclosed as being either a proximity sensor or a flow sensor.

As will be seen from the discussion which follows, the coolant control valve assembly of the present invention includes a manifold having a supply passageway which supplies coolant to the welding gun and a return passage which receives coolant from the welding gun; a controller which controls the supplying of coolant to the welding gun; a valve associated with the supply passageway; an actuator electrically coupled to the control means for receiving an electrical signal and causing the valve to remain open or to close; and one or more sensors which reduced coolant flows through the passageways, the sensor(s) being electrically coupled to the controller and providing an electrical signal to the controller indicating inadequate coolant flow through the system.

Additional benefits and advantages of the present invention will become apparent to those skilled in the art to which the present invention relates from the subsequent description of the preferred embodiments and the appended claims, taken in conjunction with the accompanying drawings.

DETAILED DESCRIPTION OF THE PREFERRED EMBODIMENT

Figure 1:
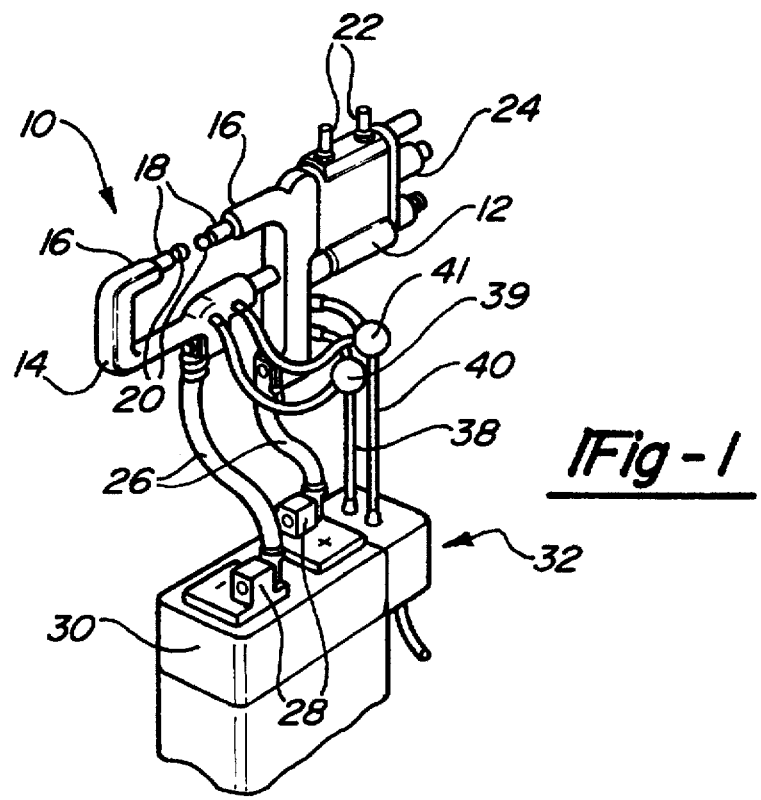
FIG. 1 is perspective view of a welding gun embodying the principles of the present invention.

Referring now in detail to the drawings, a resistance welding gun is shown in FIG. 1 and generally designated at 10. The welding gun 10 includes a pair of arms, a fixed arm 12 and a movable arm 14, each of which includes an electrode holder 16 that secures an electrode 18 with an electrode tip 20.

In operation, a robotic arm, partially shown and generally designed at 24, positions the welding gun 10 relative to a pair of workpieces (not shown). When properly positioned, pneumatic or hydraulic pressure, provided through lines 22, causes the movable arm 14 to move toward the fixed arm 12 forcing the electrodes 18 and tips 20 to come together in contact in the workpieces. When the tips 20 contact the workpieces, electrical current flows between the electrodes 18 causing localized welding of the workpieces in the area of contact. Upon the release of the applied pressure, the welding tips 20 separate and the robotic arm 24 repositions the welding gun 10 for the next weld along the workpieces. The electrical energy needed for welding is provided to the welding gun 10 by cables 26 connected between the arms 14 and 16 and terminals 28 on an electrical power supply housing 30.

Figure 2:
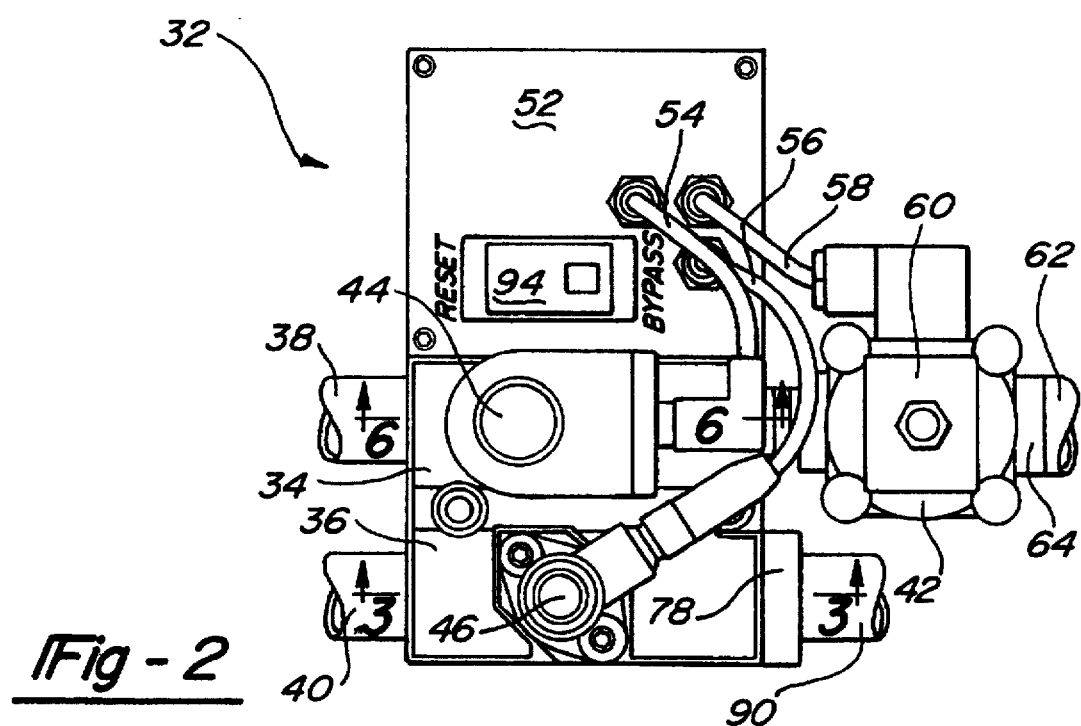
FIG. 2 is a plan view of a coolant control valve assembly embodying the principles of the present invention without a welding gun being illustrated.
Figure 3:
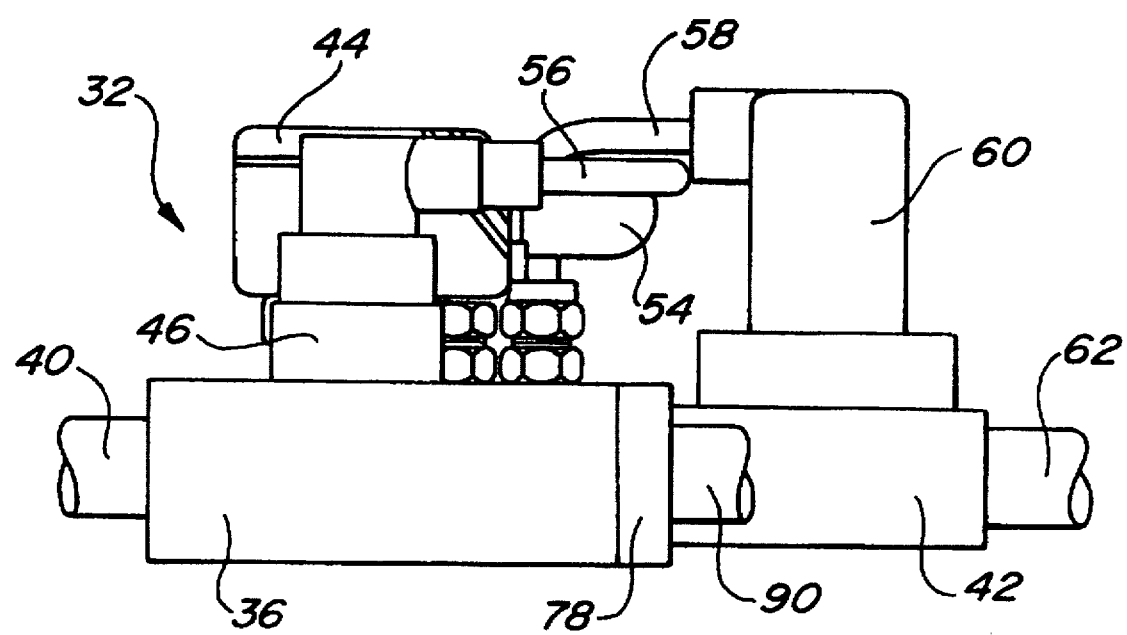
FIG. 3 is a side elevational view of the assembly seen in FIG. 2.
Figure 4:
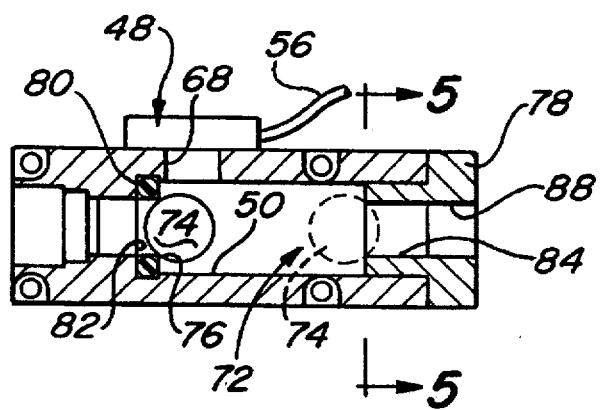
FIG. 4 is a sectional view taken substantially along line 3—3 in FIG. 2 illustrating relative positioning of the return passageway, check valve and sensor.
Figure 5:
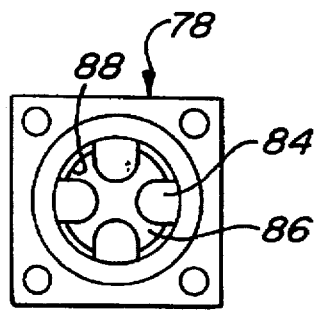
FIG. 5 is an end view of the portion of the check valve as generally seen along lines 5—5 in FIG. 4.
Figure 6:
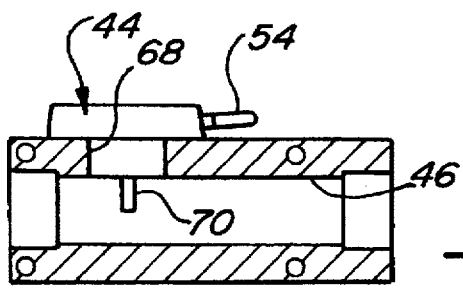
FIG. 6 is a sectional view taken generally along lines 6—6 in FIG. 2 illustrating the relative positioning of the supply passageway and sensor.

To prevent excessive heating of and damage to the welding tips 20 and the electrodes 18, a coolant, usually water, is circulated through the welding gun 10. The supply of coolant is controlled by a control valve assembly 32 as seen in FIG. 2. This assembly 32 generally includes a supply manifold 34 connected to a supply line 38 and a return manifold 36 connected to a return line 40, the lines respectively leading to and from the welding gun 10. A control valve 42 is provided in-line on the inlet side with the supply manifold 34 and a flow sensor 44 is mounted to the manifold 34 in communication with a supply passageway 46 defined through the manifold 34 (as generally seen in FIG. 6). Mounted to the return manifold 36 is a proximity sensor 48 which is in communication with a return passageway 50 defined through the manifold 36, as generally seen in FIG. 4.

The sensors 44 and 48 are electrically connected to a controller 52 through cables 54 and 56, respectively. The controller 52 is in turn electrically connected by cable 58 to a solenoid actuator 60, which is coupled to actuate the control valve 42.

The control valve has any one of numerous well known common constructions and is illustrated as a diaphragm/plunger 61 variety. In this variety, when the actuator 60 is energized, the plunger 63 is moved upward pulling the diaphragm 65 out of engagement with the valve body 67, allowing coolant to flow around the plenum 69 as generally indicated by the arrows.

During use, the control valve assembly 32 receives the coolant via a coolant source supply line 62. This source supply line 62 is connected at an inlet 64 to the control valve 42 which is further connected to the supply passageway 46 of the supply manifold 34.

The flow of coolant through the supply passageway 46 is monitored by the flow sensor 44. To achieve this, the sensor 44 is mounted in an aperture 68 that is defined in the manifold 34, generally transverse to the axis of the supply passageway 46. The flow sensor 44 is a calometric sensor and includes a probe 70 that extends into the flow passageway 46. The probe 70 itself monitors the temperature of the coolant flow in two areas, at the center of the passageway 46 and adjacent to the sidewall of the passageway 46. By determining the temperature difference between the center and sides of the coolant flow, the flow rate of the coolant can be calculated. A potentiometer (not shown) provides the flow sensor 44 with an adjustable trip point. The particular type of sensor used to monitor the flow rate of the coolant need not specifically be of the type described above. It is anticipated that numerous other types of flow sensors could be similarly employed.

To provide coolant to both holders 16 of the welding gun 10, a divergent Y-connector 39 is positioned in-line with the supply line 38. From the welding gun 10, coolant from each holder 16 is collected in another convergent Y-connector 41, in-line with the return line 40, which delivers the now heated coolant to the return manifold 36.

A check valve 72 is positioned within the return passageway 50 of the manifold 36. The check valve 72 is of the ball-type variety and includes a ball element 74 whose movement is restrained within the return passageway 50 by a valve seat 76 (on the upstream side) and a retainer plug 78 (on the downstream side). The valve seat 76 is formed by a rubber seal 80 that is retained in a groove 82 defined in the return passageway 50. The retainer plug 78 includes spacers 84 that extend axially within the passageway 50 in the direction of the ball element 74. Located equidistantly around the passageway 50, channels 86 are defined between each pair of the adjacent spacers 84. Accordingly, when the ball element 74 is engaged with the spacers 84, coolant flowing through the return passageway 50 continues around the ball element 74, through the channels 86, out a central orifice 88 in the retainer plug 78 and into a coolant source return line 90.

In use, the controller 52 provides an electrical signal that energizes the actuator 60. The energized actuator 60 causes the control valve 42 to open allowing coolant to flow from the source supply line 62, through the control valve 42 and into the supply passageway 46 of the supply manifold 34. In the passageway 46, the coolant encounters the probe 70 of the flow sensor 44 before being transferred to the welding gun 10 through the supply line 38.

At the welding gun 10, the coolant circulates through the holders 16 to cool the electrodes 18 and tips 20. The spent coolant is then returned through line 40 to the return passageway 50 of the manifold 36. The normal flow of coolant through the return line 46 causes the ball element 74 of the check valve to be biased against the retainer plug 78 and flow is uninhibited.

During normal flow of coolant through the control valve assembly 32, the combined signals from the flow sensor 44 and the proximity sensor 48 cause the controller 52 to maintain the control valve 42 in its open condition. If an insufficient flow of coolant is being provided through the supply passageway 46 to the welding gun 10, the flow sensor 44 will trip. In response, the controller 52 de-energizes the actuator 60 and doses off the control valve 42. The controller 52 also shuts down electrical power to the welding gun 10.

As the term is used herein, an "insufficient flow" of coolant is intended to mean an amount of coolant which is less than the minimum amount which would adequately cool the electrodes 18 and tips 20 during operation of the welding gun 10. Obviously, precisely what constitutes an adequate flow will depend on the particulars of the welding gun and the application with which the assembly is being used, as well as the manner and frequency of use. Inadequate coolant flow through the supply manifold 34 can result from a variety of causes, including, without limitation, the failure of the coolant source, an obstruction in the source supply line 62, or a leak in the coolant source line 62.

If the supply of coolant is not compromised, but a leak develops in the subsequent flow circuit, (in either the supply line 38, holders 16, electrodes 18, electrode tips 20, or return line 40), back pressure in the coolant source return line 90 will bias the ball element 74 into engagement with the valve seat 76 of the rubber seal 80. When engaged with the valve seat 76, the ball element 74 will be adjacent to the proximity sensor 48. The cylindricator-type proximity sensor 48 is tripped by this presence of the ball element 74. In response to the tripping of the proximity sensor, the controller 52 de-energizes the actuator 60 and closes the control valve 42 to stop the leak.

Figure 9:
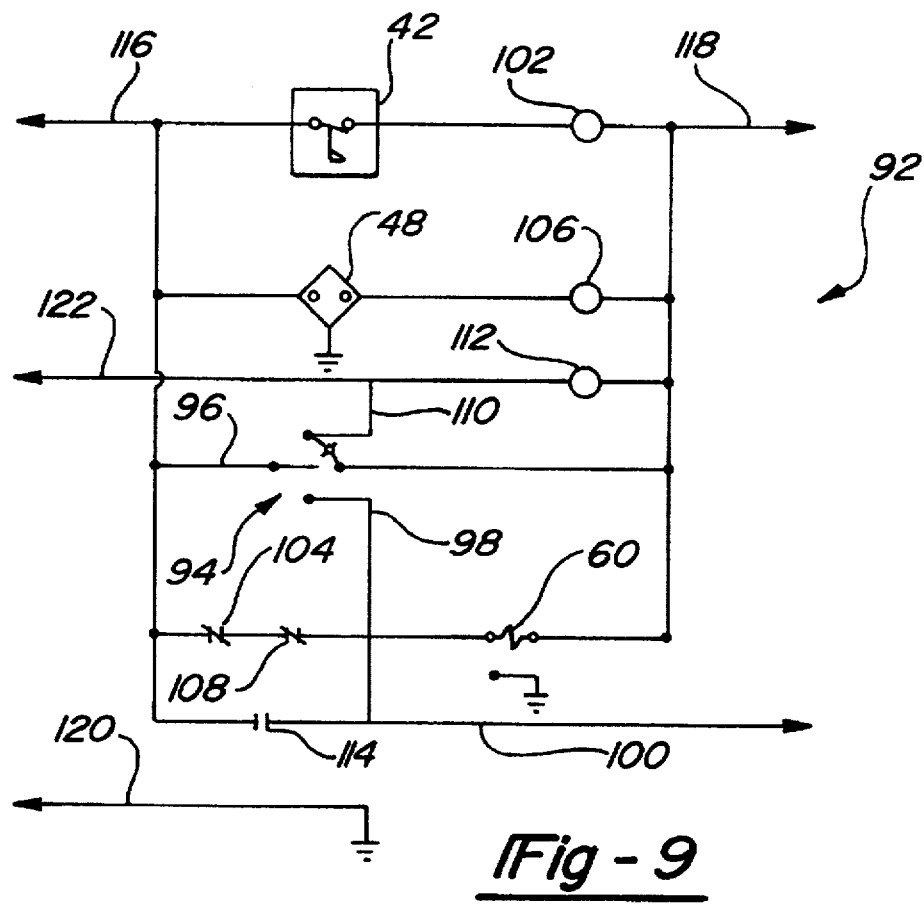
FIG. 9 is a schematic diagram of the electrical circuit utilized by the present invention of the first embodiment.

During the initial power-on of the assembly 32, a three position, reset/bypass switch 94 of the control circuit 92 (seen in FIG. 9) is depressed to "reset", establishing a momentary connection between lines 96 and 98 and allowing line 100 to go high. This energizes the solenoid actuator 60 and opens the control valve 42 to establish coolant flow through the assembly 32.

During normal flow, the flow sensor 44 is closed and this in turn powers up relay 102 which causes a contact 104 to close. The closing of contact 104 continues to energize the actuator 60 and maintains the valve 42 open. The proximity sensor 48 remains open during normal flow and the associated relay 106 is not energized, contact 108 is normally closed and the actuator 60 energized.

In a low flow or fault condition through the inlet passageway 46, the flow sensor 44 opens, de-energizing the relay 102 and opening the contact 104. This makes line 100 low and de-energizing the actuator 60 to close the valve 42. If there is a leak in the coolant circuit beyond the supply manifold 34, decreased line pressure through the return manifold 36 allows the back pressure in the coolant return line 90 to bias the ball element 74 into engagement with the valve seat 76 and close the check valve 72. Sensing the ball element 74, the proximity sensor 48 closes, energizing the relay 106 and, in turn, opening the contact 108 to make line 100 low. This de-energizes the solenoid actuator 60 and closes the valve 42.

If the reset/bypass switch 94 is held in the bypass position, connecting lines 96 and 110, relay 112 is energized and contact 114 is closed. This makes line 100 high and energizes the solenoid 60, keeping the valve 42 open regardless of the respective signals from the flow sensor 44 and the proximity sensor 48.

Additionally, pin 116 is held at 24 volts D.C., pin 118 at 0 volts D.C., pin 120 is a ground and pin 122 is utilized as a remote bypass, if desired. Alternatively, if desired, the present invention could be configured to operate off of 120 volts A.C. with approximate changes in the circuitry.

Figure 7:
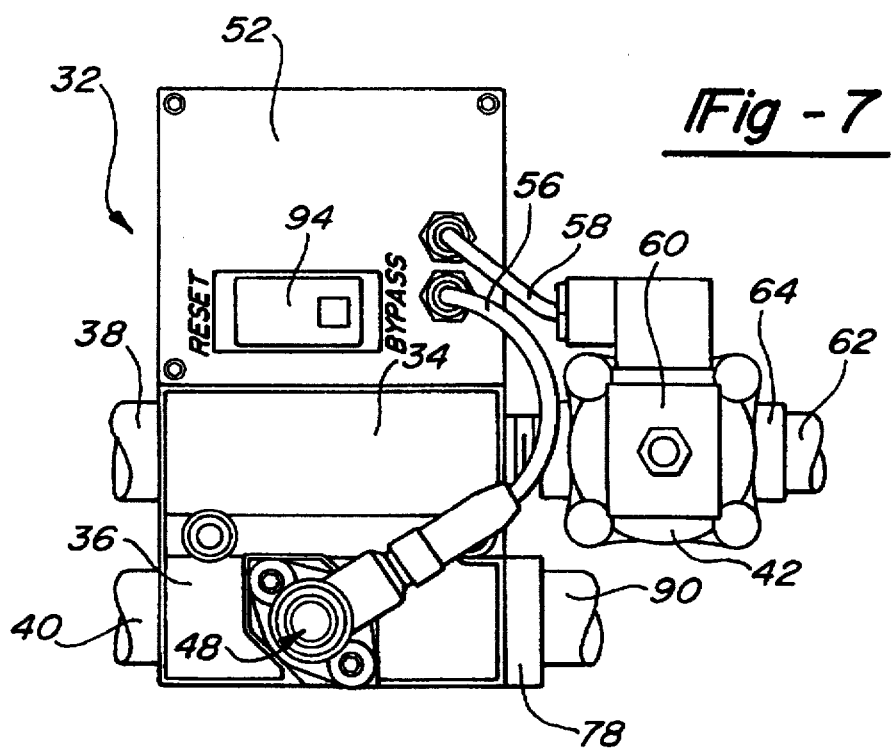
FIG. 7 is a plan view of a coolant control valve assembly according to a second embodiment of the present invention.

Referring now to FIG. 7, a second embodiment of the control valve assembly 32 has many features in common with the first embodiment and therefore like elements are designated with like references. The second embodiment differs from the first embodiment in that only a proximity sensor 46 is used and located in the return manifold 36. A flow sensor is not incorporated into the supply manifold 34 of the second embodiment. In all other respects, the control valve assembly 32 of the second embodiment operates in the same manner as the first embodiment.

Figure 8:
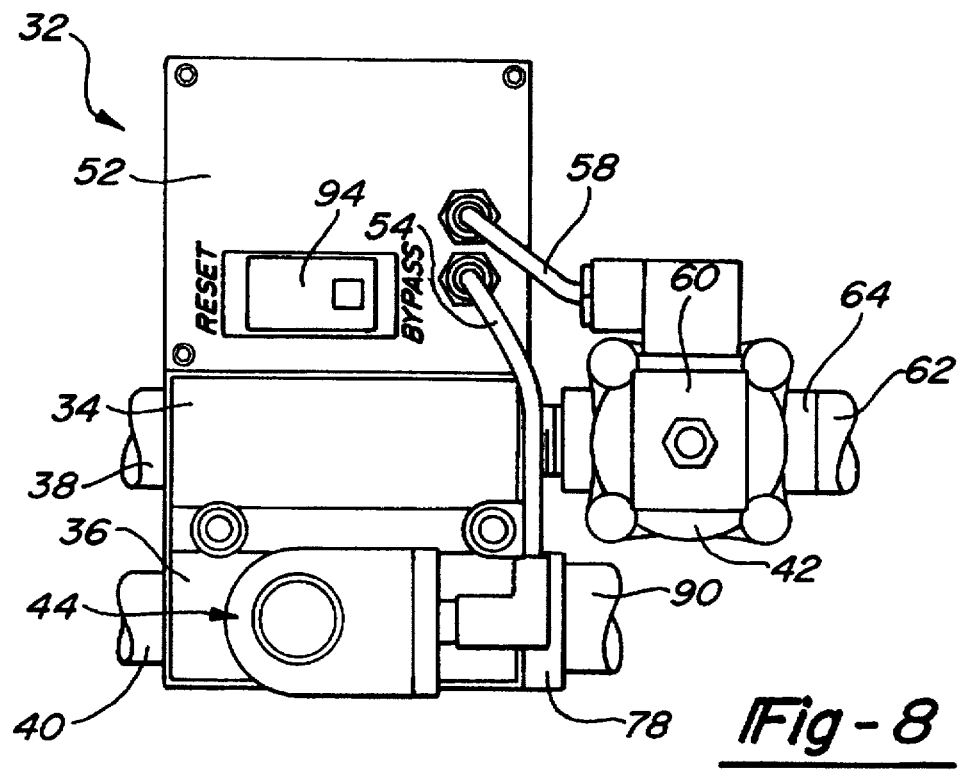
FIG. 8 is a plan view of a coolant control valve assembly according to a third embodiment of the present invention.

A third embodiment of the present invention is illustrated in FIG. 8. The third embodiment includes numerous elements which are common to the first and second embodiments. Accordingly, like elements are designated with like references. The third embodiment differs from the second embodiment in that, instead of a proximity sensor being utilized in the return manifold 36, a flow sensor 44 is incorporated thereinto. The flow sensor 44 is positioned so that its probe is located upstream of the valve seat 76 and ball element 74. In this way the probe 70 will not interfere with the operation of the check valve 72. In all other respects, the third embodiment operates in the same manner as the first and second embodiments.

While the above description constitutes the preferred embodiment of the present invention, it will be appreciated that the invention is susceptible to modification, variation and change without departing from the proper scope and fair meaning of the accompanying claims.

We claim:

1. A coolant control valve assembly adapted to provide coolant to an automatic welding gun and to receive coolant therefrom, said assembly comprising:

a supply manifold defining a supply passageway therethrough adapted to provide coolant to said welding gun;

a return manifold defining a return passageway therethrough and adapted to receive coolant from said welding gun;

a check valve located in said return passageway;

control valve means coupled to said supply passageway for controlling the providing of coolant to the welding gun;

an actuator connected to said control valve means, said actuator opening and closing said control valve means;

a controller electrically coupled to said actuator and adapted to provide a signal thereto to cause opening and closing of said control valve means; and sensor means for detecting coolant flow through said return passageway, said sensor means providing an indicia to said controller when coolant flow is at a rate less than a predetermined coolant flow rate, said controller causing said actuator to close said valve means in response to said indicia from said sensor means.

2. A coolant control valve as set forth in claim 1 wherein said sensor means includes a calometric flow sensor.

3. A coolant control valve as set forth in claim 1 wherein said sensor means includes a proximity sensor.

4. A coolant control valve as set forth in claim 3 wherein said proximity sensor senses a position of a valve element in said check valve.

5. A coolant control valve as set forth in claim 4 wherein said proximity sensor senses a closed condition of said check valve.

6. A coolant control valve as set forth in claim 1 wherein said check valve includes a valve element biased into open and closed conditions by coolant flow through said return passageway.

7. A coolant control valve as set forth in claim 1 wherein said check valve is a ball-type check valve.

8. A coolant control valve as set forth in claim 7 wherein said sensor means senses a position of a ball-type valve element of said check valve.

9. A coolant control valve as set forth in claim 1 wherein said sensor means further includes a sensor for detecting flow through said supply passageway and providing an indicia to said controller when coolant flow is at a rate less than a predetermined flow rate.

10. A coolant control valve assembly adapted to control and provide coolant to an automatic welding gun, said assembly comprising:

a supply manifold defining a coolant supply passageway adapted to supply coolant to said welding gun;

control valve means connected in-line with said coolant supply passageway, said control valve means for permitting the passage of coolant therethrough and to said welding gun when open and for preventing the passage of coolant therethrough when closed;

an actuator connected to said control valve means for opening and closing said control valve means;

a controller electrically connected to said actuator and adapted to provide a control signal thereto to cause opening and closing of said control valve means;

first sensor means for sensing coolant flow through said inlet passageway, said first sensor means providing an indicia to said controller when coolant flow through said inlet passageway is at a rate less than a predetermined coolant flow rate therethrough;

a return manifold defining a coolant return passageway adapted to receive coolant from said welding gun;

a check valve positioned in said return passageway, said check valve being biased between an open position and a closed position in response to coolant flow through said return passageway; and a second sensor means for sensing coolant flow through said return passageway, said second sensor means providing an indicia to said controller when coolant flow through said return passageway is at a rate less than a predetermined coolant flow rate therethrough.

11. A coolant control valve assembly as set forth in claim 10 wherein said first sensor means includes a probe positioned in said supply passageway.

12. A coolant control valve assembly as set forth in claim 10 wherein said second sensor means senses said check valve in a closed condition.

13. A coolant control valve assembly as set forth in claim 12 wherein said second senor means is a proximity sensor.

14. A coolant control valve assembly as set forth in claim 10 wherein said first sensor means is a flow sensor and said second sensor means is a proximity sensor.

* * * * *